(12) United States Patent
Storck et al.

(10) Patent No.: US 8,089,747 B2
(45) Date of Patent: Jan. 3, 2012

(54) POWER PEDESTAL AND SYSTEM EMPLOYING SAME

(75) Inventors: Gregory Mitchell Storck, Williamsburg, VA (US); Barry James Sharp, Gloucester, VA (US); Alston Gareth Brooks, Grafton, VA (US); Steven Christopher Saad, Williamsburg, VA (US); Paul David Seff, Williamsburg, VA (US)

(73) Assignee: Eaton Corporation, Cleveland, OH (US)

( * ) Notice: Subject to any disclaimer, the term of this patent is extended or adjusted under 35 U.S.C. 154(b) by 74 days.

(21) Appl. No.: 12/470,657

(22) Filed: May 22, 2009

(65) Prior Publication Data

US 2010/0296230 A1 Nov. 25, 2010

(51) Int. Cl.
*H02B 1/26* (2006.01)

(52) U.S. Cl. ........ 361/641; 361/624; 361/652; 361/665; 174/38; 174/59; 320/109

(58) Field of Classification Search ................. 361/601, 361/622, 624, 627, 634, 641, 643, 652, 659–673; 174/37, 38, 48, 50, 58–60, 17 CT, 52 R; 439/138, 439/191; 320/109
See application file for complete search history.

(56) References Cited

U.S. PATENT DOCUMENTS

| | | | | |
|---|---|---|---|---|
| 3,341,268 A * | 9/1967 | Bickford | .................. | 312/100 |
| 3,450,951 A * | 6/1969 | Boyle | .................. | 361/664 |
| 3,585,456 A * | 6/1971 | Phillips, Jr. | .................. | 361/663 |
| 3,691,288 A * | 9/1972 | Sturdivan | .................. | 174/38 |
| 3,716,762 A * | 2/1973 | Shrader | .................. | 361/670 |
| 3,753,047 A * | 8/1973 | Shallbetter | .................. | 361/672 |
| 3,761,780 A * | 9/1973 | Plummer | .................. | 361/663 |
| 3,787,713 A * | 1/1974 | Diersing et al. | .................. | 361/650 |
| 3,800,063 A * | 3/1974 | Di Maggio et al. | .................. | 174/38 |
| 4,025,825 A * | 5/1977 | Shrader | .................. | 361/670 |
| 4,052,655 A * | 10/1977 | Vizza | .................. | 320/109 |
| 4,307,436 A * | 12/1981 | Eckart et al. | .................. | 361/652 |
| 4,450,503 A * | 5/1984 | Warner | .................. | 361/641 |
| 4,456,418 A * | 6/1984 | Harter et al. | .................. | 414/351 |
| 4,458,418 A * | 7/1984 | McSmith et al. | .................. | 30/228 |
| 4,519,657 A * | 5/1985 | Jensen | .................. | 439/191 |
| 4,546,418 A * | 10/1985 | Baggio et al. | .................. | 362/85 |
| 4,785,376 A * | 11/1988 | Dively | .................. | 361/622 |
| 4,864,467 A * | 9/1989 | Byrd et al. | .................. | 361/664 |
| 4,873,600 A * | 10/1989 | Vogele | .................. | 361/823 |

(Continued)

OTHER PUBLICATIONS

Eaton Corp. "Power Outlet Panels, Product Guide" APowerful Solutin for Construction, RV Parks & Marinas Aug. 31, 2006.

*Primary Examiner* — Michail V Datskovskiy

(74) *Attorney, Agent, or Firm* — Martin J. Moran

(57) ABSTRACT

A power pedestal provides power to a vehicle and a structure disposed separate from the vehicle. The power pedestal includes a housing having an exterior, a first end fixed to a platform, and a second end disposed opposite and distal from the first end. A meter socket assembly is housed by the housing. At least one first branch circuit breaker and a second main circuit breaker are electrically connected to the meter socket assembly within the housing. At least one of the at least one first branch circuit breaker is electrically connected to the vehicle by a corresponding one of a number of first electrical conductors. The second main circuit breaker is electrically connected to the structure by a second electrical conductor. A meter, which is electrically connected to the meter socket assembly, measures electric energy consumed by the vehicle and the structure.

16 Claims, 3 Drawing Sheets

U.S. PATENT DOCUMENTS

| | | | |
|---|---|---|---|
| 4,888,448 A * | 12/1989 | Moerman | 174/38 |
| 4,951,182 A * | 8/1990 | Simonson et al. | 362/145 |
| 5,184,279 A | 2/1993 | Horn | |
| 5,196,988 A | 3/1993 | Horn | |
| 5,232,277 A | 8/1993 | Cassady | |
| 5,306,999 A * | 4/1994 | Hoffman | 320/109 |
| 5,344,330 A * | 9/1994 | Hoffman | 439/138 |
| 5,400,212 A * | 3/1995 | Hanson | 361/665 |
| 5,404,266 A * | 4/1995 | Orchard et al. | 361/667 |
| 5,418,683 A * | 5/1995 | Orchard et al. | 361/672 |
| 5,546,269 A * | 8/1996 | Robinson et al. | 361/660 |
| 5,548,200 A * | 8/1996 | Nor et al. | 320/109 |
| 5,584,715 A * | 12/1996 | Ehrenfels | 439/222 |
| 5,729,740 A | 3/1998 | Tsumura | |
| 5,758,414 A * | 6/1998 | Ehrenfels | 29/857 |
| 5,838,078 A * | 11/1998 | Tipton | 307/147 |
| 5,984,706 A * | 11/1999 | Kakuta et al. | 439/310 |
| 6,018,726 A | 1/2000 | Tsumura | |
| 6,081,205 A * | 6/2000 | Williams | 340/932.2 |
| 6,087,818 A | 7/2000 | Hughes | |
| RE37,125 E | 4/2001 | Carlson et al. | |
| 6,266,233 B1 * | 7/2001 | O'Regan | 361/659 |
| 6,614,204 B2 * | 9/2003 | Pellegrino et al. | 320/109 |
| 6,712,619 B2 * | 3/2004 | Marshall et al. | 439/34 |
| 6,844,716 B1 * | 1/2005 | Lundberg et al. | 324/142 |
| 7,085,128 B2 * | 8/2006 | Wilfong | 361/665 |
| 7,361,832 B2 * | 4/2008 | Dively | 174/38 |
| 7,570,481 B2 * | 8/2009 | Seff et al. | 361/624 |
| 7,807,924 B2 * | 10/2010 | Wurzer | 174/59 |
| 2004/0233605 A1 | 11/2004 | Dabrowski et al. | |
| 2007/0284370 A1 | 12/2007 | Dively | |
| 2008/0040223 A1 * | 2/2008 | Bridges et al. | 705/14 |
| 2008/0253061 A1 | 10/2008 | Seff et al. | |
| 2008/0253062 A1 | 10/2008 | Seff et al. | |
| 2008/0304212 A1 | 12/2008 | Seff et al. | |
| 2009/0184689 A1 * | 7/2009 | Kressner et al. | 320/162 |
| 2009/0259603 A1 * | 10/2009 | Housh et al. | 705/412 |
| 2010/0045232 A1 * | 2/2010 | Chen et al. | 320/109 |
| 2010/0198751 A1 * | 8/2010 | Jacobus | 705/412 |

\* cited by examiner

POWER PEDESTAL AND SYSTEM EMPLOYING SAME

BACKGROUND

1. Field

The disclosed concept relates generally to power pedestals and, more particularly, to power pedestals such as vehicle power pedestals. The disclosed concept also relates to systems for providing power output from power pedestals.

2. Background Information

Power pedestals, which are free-standing outdoor electrical enclosures, are generally old and well known in the art.

Typically, a power pedestal includes an upstanding housing, the base of which is disposed on a dock, a pier, or any other suitable foundation (e.g., platform), and is structured to receive, for example and without limitation, power cables, telephone lines, television cables, Internet service lines, and water service lines. The housing is made from a weather-resistant material, such as a suitable plastic or metal (e.g., without limitation, stainless steel), and is designed to enclose the power cables, lines and other cables, and the electrical components, receptacles and connectors which are electrically connected to the lines, in order to shield and protect them from the environment. Accordingly, power pedestals are well suited for use in environments such as marinas and recreational vehicle (RV) parks, where they must remain outdoors exposed to environmental elements as they serve to provide plug-in power and/or connectivity (e.g., without limitation, telephone service; Internet service; cable television; water service), for example, for boats and RVs and other vehicles. Some power pedestals are known to employ electricity meters that measure and display power or energy consumption.

Sometimes power pedestals are only used for a relatively short period of time, for example, to provide the aforementioned plug-in power and/or connectivity to a transient vehicle on a temporary basis while the vehicle is stopped in the marina or RV park. However, it is not uncommon for the tenants of some RV parks, for example, to occupy a specific camping site on a consistent or substantially permanent basis, wherein in addition to parking the vehicle on the site for an extended period of time, the tenant also builds a secondary structure, such as a building (e.g., without limitation, shed; wash house; restroom; out building). Under such circumstances, in addition to power supplied to the vehicle (e.g., without limitation, RV) by the power pedestal, the tenant might also require power for electrical apparatus (e.g., without limitation, a washing machine; a dryer) disposed in the building.

There is room for improvement in power pedestals and systems for providing power output from power pedestals.

SUMMARY

These needs and others are met by embodiments of the disclosed concept, which are directed to a power pedestal for providing power to a system including both a vehicle and a structure disposed separate from the vehicle.

As one aspect of the disclosed concept, a power pedestal is provided for providing power to a vehicle and a structure disposed separate from the vehicle. The power pedestal comprises: a housing comprising an exterior, a first end structured to be fixed to a platform, and a second end disposed opposite and distal from the first end; a meter socket assembly housed by the housing; at least one first branch circuit breaker electrically connected to the meter socket assembly within the housing, each of the at least one first branch circuit breaker being structured to be electrically connectable to the vehicle by a corresponding one of a number of first electrical conductors; a second main circuit breaker electrically connected to the meter socket assembly within the housing, the second main circuit breaker being structured to be electrically connectable to the structure by a second electrical conductor; and a meter electrically connected to the meter socket assembly, the meter being structured to measure electric energy consumed by the vehicle and the structure.

As another aspect of the disclosed concept, a system is provided for providing power from a power pedestal. The system comprises: a vehicle; a structure disposed separate from the vehicle; a plurality of electrical conductors; and a power pedestal comprising: a housing comprising an exterior, a first end, and a second end disposed opposite and distal from the first end, a meter socket assembly housed by the housing, a power line electrically connected to the meter socket assembly within the housing, at least one first circuit breaker electrically connected to the meter socket assembly within the housing, at least one of the at least one first circuit breaker being electrically connected to the vehicle by a corresponding one of the electrical conductors, a second circuit breaker electrically connected to the meter socket assembly within the housing, the second circuit breaker being electrically connected to the structure by another one of the electrical conductors, and a meter electrically connected to the meter socket assembly, the meter measuring electric energy consumed by the vehicle and the structure.

The power line of the power pedestal may provide plug-in power to a number of first electrical apparatus of the vehicle, and may further provide plug-in power to a number of second electrical apparatus of the structure, without a separate power line for the structure. The meter of the power pedestal may measure electric energy consumed by the number of first electrical apparatus of the vehicle, and may further measure electric energy consumed by the branch circuits of the structure, without a separate meter for the structure.

BRIEF DESCRIPTION OF THE DRAWINGS

A full understanding of the disclosed concept can be gained from the following description of the preferred embodiments when read in conjunction with the accompanying drawings in which.

DESCRIPTION OF THE PREFERRED EMBODIMENTS

Figure 1:
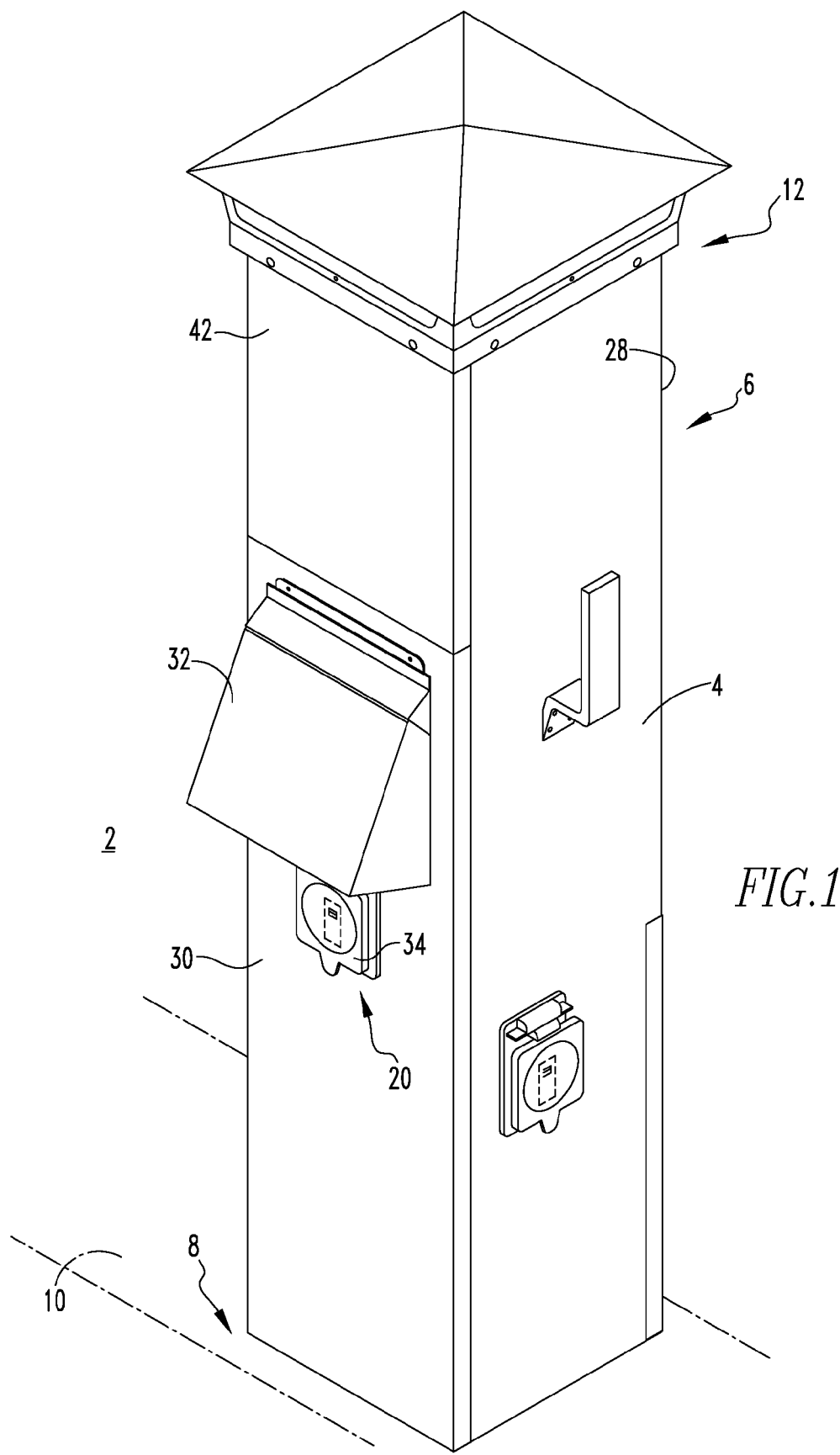
FIG. 1 is an isometric view of a power pedestal in accordance with an embodiment of the disclosed concept.

For purposes of illustration, the disclosed concept is described in association with a power pedestal for a recreational vehicle (RV), although it will be appreciated that it is also applicable to a wide range of power pedestals for vehicles other than RVs (e.g., without limitation, marina power pedestals).

As employed herein, the term "pedestal" or "pedestal member" shall mean an elongated, generally upright structure.

As employed herein, the term "power pedestal" refers to a pedestal or pedestal member structured to enclose electrical components (e.g., without limitation, contactors; circuit breakers; electric meters; transformers; light fixtures; power receptacles; telephones; telephone and/or Internet service lines and electrical connectors therefor; television cables and electrical connectors therefor), and to input power from input power terminals (e.g., without limitation, utility power terminals) and output power to a number of output power receptacles. The power pedestal thus provides a power center for providing plug-in power and/or connectivity (e.g., without limitation, telephone service; Internet service; cable television; water service), for example, for a vehicle, such as for example and without limitation, a watercraft, such as a boat, wherein the power pedestal is disposed at or about a body of water (e.g., without limitation, a suitable platform in a marina), or for a land-based vehicle such as, for example and without limitation, a recreational vehicle (RV), wherein the power pedestal is disposed on a suitable land-based foundation (e.g., without limitation, a suitable platform in a camp ground).

As employed herein, the term "platform" shall mean a horizontal flat surface, a raised horizontal flat surface, or a dock (e.g., without limitation, a floating dock; a stationary dock; a pier).

As employed herein, the term "vehicle" shall include land-based vehicles such as, for example and without limitation, automobiles, cars, trucks, station wagons, sport-utility vehicles (SUVs), recreational vehicles (RVs), vans, hybrid vehicles, buses, campers, or trailers, and marine vehicles such as, for example and without limitation, any water-based vehicles, ships, boats, other vessels for travel on water, submarines, or other vessels for travel under water.

As employed herein, the term "structure" expressly excludes a vehicle and refers to any known or suitable building (e.g., without limitation, shed; wash house; restroom; out building) or other edifice including a number of electrical apparatus which require power.

As employed herein, the term "electrical connector" refers to any known or suitable mechanism for providing an electrical connection between two electrical components and shall expressly include, but not be limited to, plugs, receptacles and terminals.

As employed herein, the term "branch circuit breaker" shall mean a circuit breaker having a current rating of 50 Amperes or less.

As employed herein, the term "main circuit breaker" shall mean a circuit breaker having a current rating of great than 50 Amperes.

As employed herein, the statement that two or more parts are "connected" or "coupled" together shall mean that the parts are joined together either directly or joined through one or more intermediate parts. Further, as employed herein, the statement that two or more parts are "attached" shall mean that the parts are joined together directly.

As employed herein, the term "number" shall mean one or an integer greater than one (i.e., a plurality).

FIG. 1 shows a non-limiting example of a power pedestal 2 in accordance with the disclosed concept. The power pedestal 2 includes a housing 4 having an exterior 6, a first end 8, which is preferably structured to be coupled to a platform 10 (partially shown in phantom line drawing in FIG. 1), and a second end 12 disposed opposite and distal from the first end 8. As will be described in greater detail hereinbelow with respect to FIG. 4, the power pedestal 2 provides power to a system 100, which includes a vehicle 200 (shown in simplified form in FIG. 4) and a structure 300 (see, for example and without limitation, building 300 partially shown in phantom line drawing in FIG. 4) disposed separate from the vehicle 200.

Figure 2:
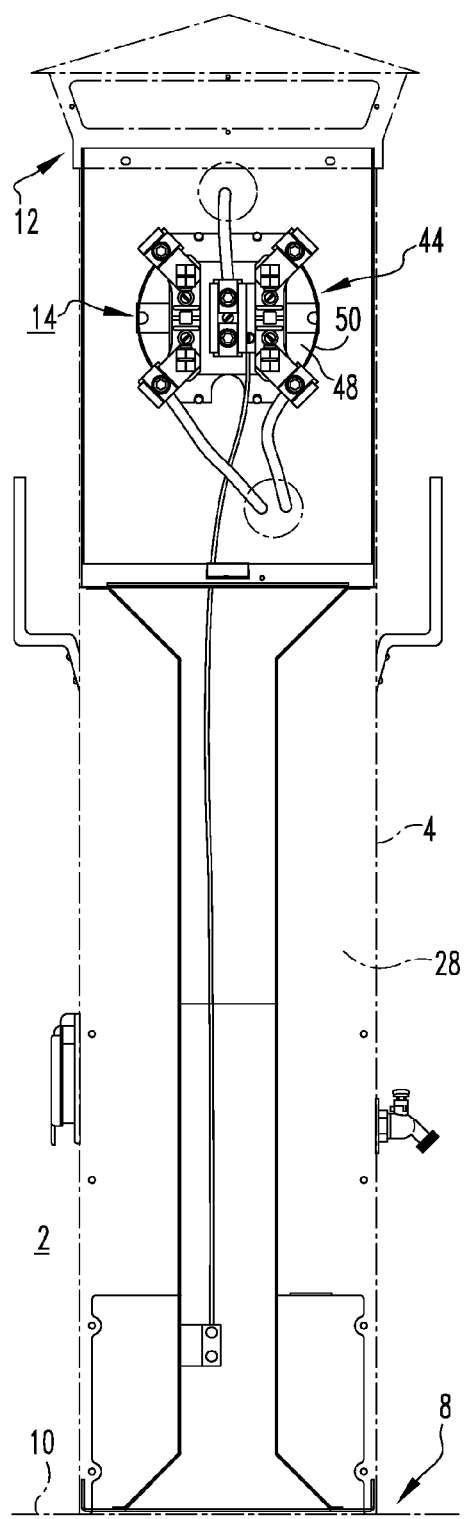
FIG. 2 is a front elevation view of the power pedestal of FIG. 1, with the power pedestal housing shown in phantom line drawing to show internal structures.
Figure 3:
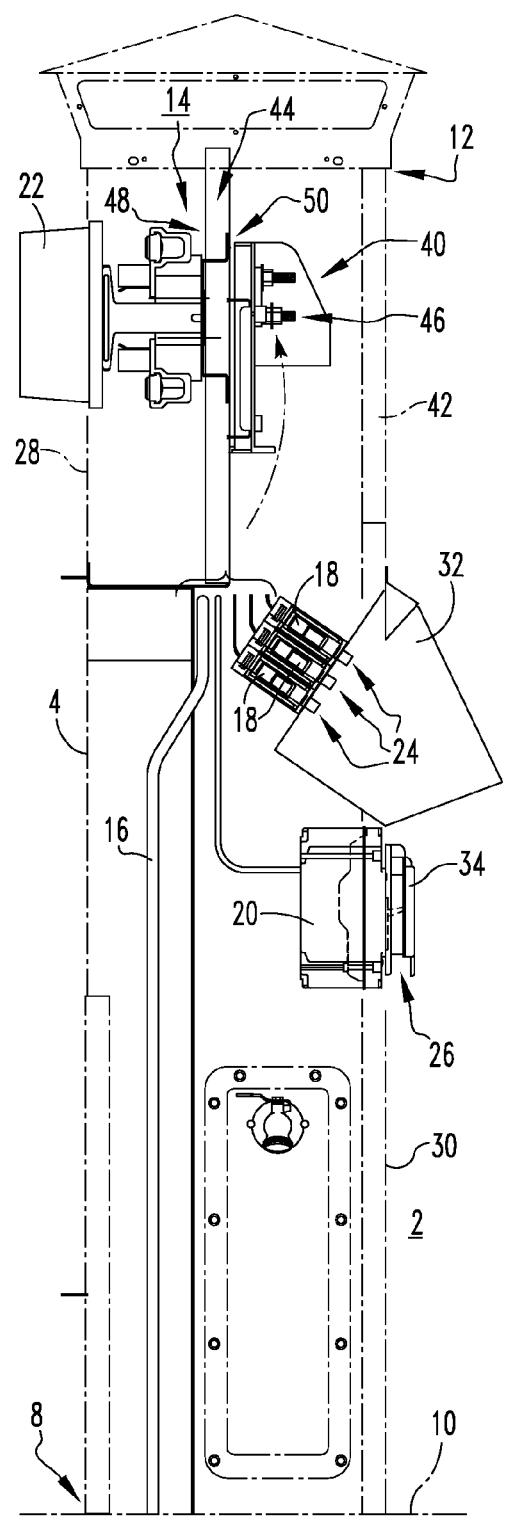
FIG. 3 is a side elevation view of the power pedestal of FIG. 2, with the power pedestal housing shown in phantom line drawing to show internal structures.
Figure 4:
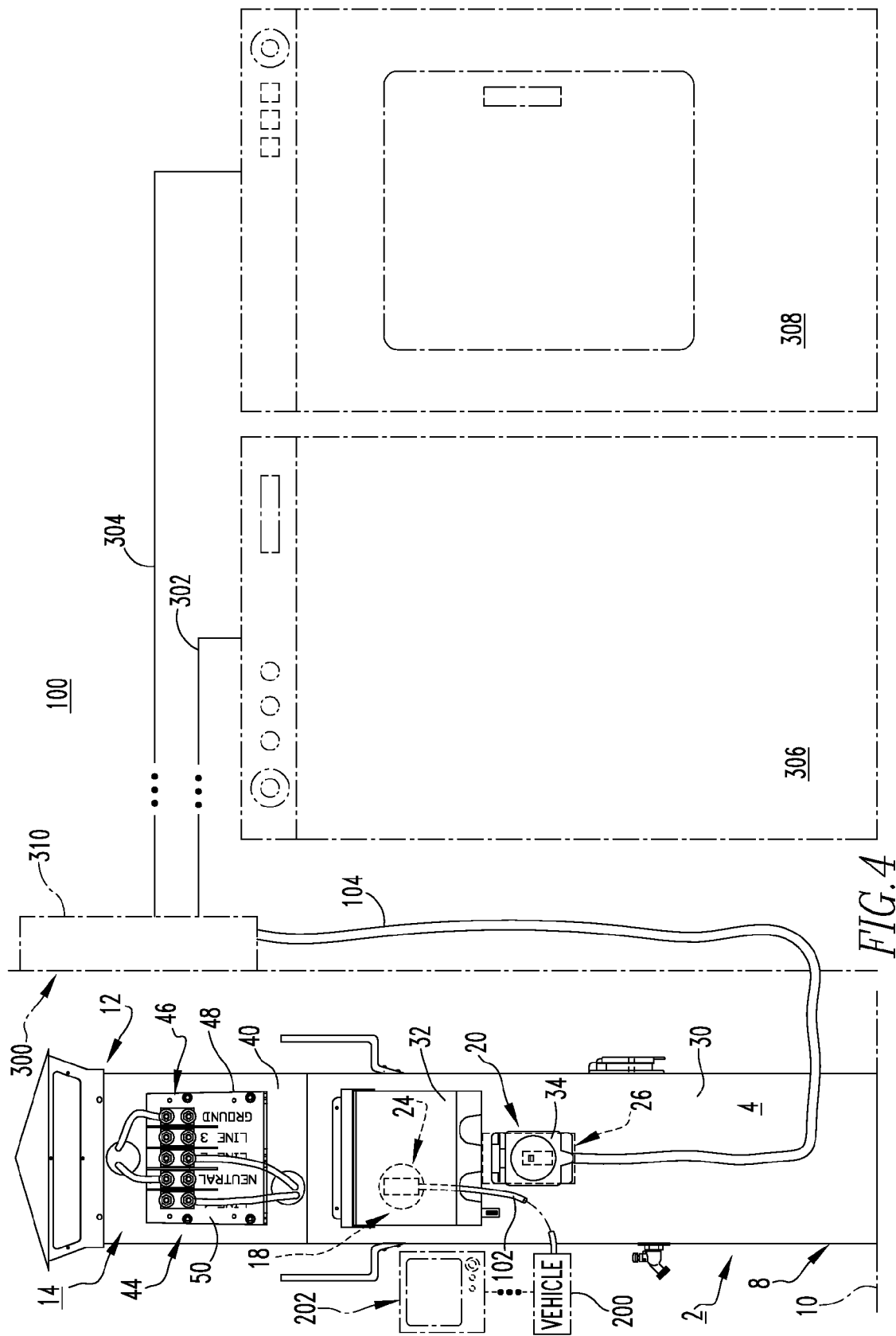
FIG. 4 is a back elevation view of a system and power pedestal therefor, in accordance with an embodiment of the disclosed concept.

Continuing to refer to FIG. 1, and also to FIGS. 2 and 3, it will be appreciated that the power pedestal 2 further includes a meter socket assembly 14 (FIGS. 2 and 3; also shown in FIG. 4), which is housed by the power pedestal housing 4 (shown in phantom line drawing in FIGS. 2 and 3 to show internal structures). As shown in FIG. 3, the power pedestal 2 also includes at least one first circuit breaker such as, for example and without limitation, branch circuit breakers 18 (three are shown). The branch circuit breakers 18 are electrically connected to the meter socket assembly 14 within the housing 4, as shown in simplified form in FIG. 3. Additionally, as will be described in greater detail hereinbelow, each of the branch circuit breakers 18 is electrically connectable to the vehicle 200 (FIG. 4) of the aforementioned system 100 (FIG. 4) by a corresponding first electrical conductor (FIG. 4). A second circuit breaker, which in the example shown and described herein is a main circuit breaker 20, is also electrically connected to the meter socket assembly 14 within the power pedestal housing 4, as shown in simplified form in FIG. 3, and is electrically connectable to the aforementioned building 300 (FIG. 4) or other suitable structure (not shown) by a second electrical conductor 104 (FIG. 4). A meter 22 (FIG. 3) is electrically connected to the meter socket assembly 14 to measure energy consumed by the vehicle 200 (FIG. 4) and the building 300 (FIG. 4).

More specifically, the power pedestal housing 4 preferably further includes first electrical connectors 24 (FIG. 3; one first electrical connector 24 is also shown in simplified form in hidden line drawing in FIG. 4) electrically connected to the first branch circuit breakers 18 (FIG. 3), and a second electrical connector 26 (FIGS. 3 and 4) electrically connected to the second main circuit breaker 20. The first electrical connector 24 and the second electrical connector 26 are accessible from the exterior 6 of the housing 4, as shown in FIGS. 3 and 4. In this manner, the vehicle 200 (FIG. 4) and building 300 (FIG. 4) or other suitable structure (not shown) are electrically connectable to the corresponding electrical connectors 24,26 (FIGS. 3 and 4) of the power pedestal 2, such that power is supplied from the power line 16 (e.g., without limitation, utility power line 16 partially shown in FIG. 3) that is electrically connected to the meter socket assembly 14 within the power pedestal housing 4, as shown in simplified form in FIG. 3, to both the vehicle 200 (FIG. 4) and building 300 (FIG. 4).

In the example of FIG. 4, the vehicle 200 (shown in simplified form for simplicity of illustration) includes a number of first electrical apparatus such as, for example and without limitation, the television 202 shown in simplified form in phantom line drawing in FIG. 4. The building 300 includes a number of branch circuits 302,304 (two are shown) for providing power to a number of second electrical switching apparatus such as, for example and without limitation, the washing machine 306 and dryer 308 shown in simplified form in phantom line drawing in FIG. 4. Accordingly, in operation, a corresponding one of the first electrical connectors 24 (shown in hidden line drawing in simplified form in FIG. 4) is electrically connected to a corresponding first electrical apparatus (e.g., without limitation, television 202) of the vehicle 200 by a corresponding first electrical power cable 102 (partially shown in FIG. 4), and the second electrical connector 26 of the main circuit breaker 20 is electrically connected, preferably through a load center 310 (shown in simplified form in phantom line drawing in FIG. 4), to the branch circuits 302, 304 of the building 300 by a second electrical power cable 104. It will, however, be appreciated that the vehicle 200 could have any known or suitable alternative number, type and/or configuration of first electrical apparatus (not shown) other than the television 202, shown. It will further be appreciated that the building 300 could have any know or suitable alternative configuration and could contain any known or suitable alternative number (e.g., one; three or more) of branch circuits (e.g., 302,304), and any known or suitable alternative number, type and/or configuration of second electrical apparatus (not shown) other than the washing machine 306 and dryer 308, shown.

Accordingly, it will be appreciated that the power pedestal 2 provides power to both the first electrical apparatus (e.g., without limitation, television 202) of the vehicle 200, and further provides power to the second electrical apparatus (e.g., without limitation, washing machine 306 and dryer 308) of the building 300, without a separate utility power line being required for the building 300. Additionally, the meter 22 (FIG. 3) of the power pedestal 2 measures electric energy consumed by both the first electrical apparatus (e.g., without limitation, television 202) of the vehicle 200, and further measures electric energy consumed by the branch circuits 302,304 of the building 300, without requiring a separate meter for the building 300.

Preferably, the power pedestal 2 offers "plug-in" power to the vehicle 200 and building 300, meaning that the first and second electrical power cables 102,104 are adapted to be plugged into the corresponding electrical connectors 24,26, respectively, of the power pedestal 2. However, it will be appreciated that at least the electrical connector 26 of the main circuit breaker 20 could be directly electrically connected to the second electrical power cable 104. That is, the second electrical power cable 104 could be directly connected to the load terminals of the main circuit breaker 20 through the housing 4 of the power pedestal 2. In such a configuration, the main circuit breaker load terminals would comprise the electrical connector 26, as defined herein. It will further be appreciated that while the second main circuit breaker 20 is contemplated as being a 100 Ampere main circuit breaker, that it could alternatively be any known or suitable second circuit breaker having any known or suitable current rating for providing the desired power to the separate structure 300 (e.g., without limitation, building).

The housing 4 of the example power pedestal 2 is generally rectangular in shape and includes first and second opposing sides 28,30 (both shown in phantom line drawing in FIG. 3), wherein the meter 22 is disposed on the first side 28, as shown in FIG. 3, and the first and second electrical connectors 24,26 are disposed on the second side 30, as shown in FIGS. 1, 3 and 4. It will, however, be appreciated that the power pedestal housing 4 could have any known or suitable alternative shape or configuration (not shown) and that any known or suitable alternative number, type and/or configuration of electrical connectors (e.g., 24,26) could be disposed on the power pedestal housing 4 in any desired alternative position or configuration (not shown), without departing from the scope of the disclosed concept.

As shown in FIGS. 1, 3 and 4, the housing 4 preferably further includes a first cover 32 (e.g., without limitation, a pivotable and/or lockable door or panel), which overlays and thereby protects the first electrical connectors 24 on the exterior 6 of the housing 4. The door may be of the type disclosed, for example, in commonly assigned U.S. Pat. No. 7,361,832, which is hereby incorporated herein by reference. A second cover 34 on the exterior 6 of the housing 4 overlays and, therefore, protects the second electrical connector 26. It will be appreciated that the covers 32,34 could also be lockable to prevent undesired access to the corresponding electrical connectors 24,26.

The housing 4 of the power pedestal 2 preferably further includes a meter compartment 40 (FIGS. 3 and 4), which is disposed proximate the second end 12 of the housing 4, behind a removable access panel 42 (FIGS. 1 and 3). The removable access panel 42 (FIGS. 1 and 3) is conveniently removable from the housing 4 to provide access to the meter compartment 40 and the meter socket assembly 14 disposed therein, from the exterior 6 of the housing 4. The example meter socket assembly 14 includes a meter socket 44 and an electrical bus assembly 46. The meter 22 is mounted on the first side 48 of the meter socket 44, and the electrical bus assembly 46 is disposed on the second side 50, as shown in FIG. 3. The power line 16 (e.g., without limitation, utility power line 16), first branch circuit breakers 18, and second main circuit breaker 20 are all electrically connected to the electrical bus assembly 46, as shown in simplified form in FIG. 3.

The combination of the electrical bus assembly 46 and removable access panel 42 facilitate relatively quick and easy access to the critical electrical connections of the power pedestal 2, which are conveniently located within the meter compartment 40. It will further be appreciated that the separate electrical bus assembly 46 enables the number and type of circuit breakers (e.g., without limitation, branch circuit breakers 18; main circuit breaker 20) and/or other electrical components (e.g., without limitation, cable connector; Internet connector; telephone connector) to be added or reconfigured relatively quickly and easily. Thus, the disclosed power pedestal 2 can be customized to meet the particular desired power and connectivity requirements of an individual, without requiring the entire power pedestal 2 to be replaced. Accordingly, the disclosed power pedestal 2 and system 100 provide a convenient way to power not only a vehicle 200 (FIG. 4), but also a separate structure 300 (e.g., without limitation, building) (FIG. 4), without requiring a separate power line (e.g., without limitation, utility power line) and/or meter 22 (FIG. 3) for the separate structure 300. Thus, all of the power needs of the tenant (e.g., without limitation, power to the vehicle 200; power to the structure 300) are met by the same, single power pedestal 2, and all the energy consumed by the tenant is preferably conveniently measured by the same meter 22 (FIG. 3) of the single power pedestal 2.

While specific embodiments of the disclosed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed concept which is to be given the full breadth of the claims appended and any and all equivalents thereof.

What is claimed is:

1. A power pedestal for providing power to a vehicle and a building disposed separate from said vehicle, said building including a load center, said power pedestal comprising:
   a housing comprising an exterior, a first end structured to be fixed to a platform, a second end disposed opposite and distal from the first end, a meter compartment, a first cover, a second cover, and a removable access panel, the meter compartment being disposed within said housing proximate the second end;

a meter socket assembly disposed in the meter compartment, said removable access panel being removable from said housing to provide access to the meter compartment and said meter socket assembly from the exterior of said housing;

at least one first branch circuit breaker electrically connected to said meter socket assembly within said housing, each of said at least one first branch circuit breaker being electrically connected to said vehicle by a corresponding one of a number of first electrical conductors;

a second main circuit breaker electrically connected to said meter socket assembly within said housing, said second main circuit breaker being electrically connected to said load center of said building by a second electrical conductor, thereby providing power to said building without a separate utility power line being required for said building;

a meter electrically connected to said meter socket assembly, said meter measuring electric energy consumed by said vehicle and said building, at least one first electrical connector electrically connected to a corresponding one of said at least one first branch circuit breakers; and a second electrical connector electrically connected to said second main circuit breaker, wherein said first cover overlays said at least one first electrical connector and said second cover overlays said second electrical connector, and wherein said second cover is disposed on the exterior of said housing separate and spaced apart from said first cover, in order that said at least one first electrical connector and said second electrical connector are separately accessible from the exterior of said housing.

2. The power pedestal of claim 1 wherein said vehicle comprises a number of first electrical apparatus; wherein said building comprises a number of branch circuits structured to provide power to a number of second electrical apparatus; wherein said number of first electrical conductors is a number of first electrical power cables; wherein said second electrical conductor is a second electrical power cable; wherein each of said at least one first electrical connector is structured to be electrically connected to a corresponding one of said first electrical apparatus of said vehicle by a corresponding one of said first electrical power cables; and wherein said second electrical connector is electrically connected through said load center to said branch circuits of said building by said second electrical power cable.

3. The power pedestal of claim 2 wherein said power pedestal is structured to provide plug-in power to said number of first electrical apparatus of said vehicle, and further to provide plug-in power to said number of second electrical apparatus of said building, without a separate utility power line for said building; and wherein said meter of said power pedestal is structured to measure electric energy consumed by said number of first electrical apparatus of said vehicle, and further to measure electric energy consumed by said secondary branch circuits of said building, without a separate meter for said building.

4. A system for providing power from a power pedestal, said system comprising:
 a vehicle;
 a building disposed separate from said vehicle, said building including a load center;
 a plurality of electrical conductors; and
 a power pedestal comprising:
  a housing comprising an exterior, a first end, a second end disposed opposite and distal from the first end, a meter compartment, a first cover, a second cover, and a removable access panel, the meter compartment being disposed within said housing proximate the second end,
  a meter socket assembly disposed in the meter compartment, said removable access panel being removable from said housing to provide access to the meter compartment and said meter socket assembly from the exterior of said housing,
  a power line electrically connected to said meter socket assembly within said housing,
  at least one first circuit breaker electrically connected to said meter socket assembly within said housing, at least one of said at least one first circuit breaker being electrically connected to said vehicle by a corresponding one of said electrical conductors,
  a second circuit breaker electrically connected to said meter socket assembly within said housing, said second circuit breaker being electrically connected to said load center of said building by another one of said electrical conductors, thereby providing power to said building without a separate utility power line being required for said building,
  a meter electrically connected to said meter socket assembly, said meter measuring electric energy consumed by said vehicle and said building,
  at least one first electrical connector electrically connected to a corresponding one of said at least one first branch circuit breakers; and
  a second electrical connector electrically connected to said second main circuit breaker,
  wherein said first cover overlays said at least one first electrical connector and said second cover overlays said second electrical connector, and
  wherein said second cover is disposed one the exterior of said housing separate and spaced apart from said first cover, in order that said at least one first electrical connector and said second electrical connector are separately accessible from the exterior of said housing.

5. The power pedestal of claim 1 wherein said housing further comprises a first side and a second side disposed opposite the first side of said housing; wherein said meter is disposed on the first side of said housing; and wherein said number of first electrical connectors and said second electrical connector are disposed on the second side of said housing.

6. The power pedestal of claim 1 wherein said meter socket assembly comprises a meter socket and an electrical bus assembly; wherein said meter socket includes a first side and a second side disposed opposite the first side of said meter socket; wherein said meter is mounted on the first side of said meter socket; wherein said electrical bus assembly is disposed on the second side of said meter socket; and wherein said at least one first branch circuit breaker and said second main circuit breaker are electrically connected to said electrical bus assembly.

7. The power pedestal of claim 1 wherein said second main circuit breaker is a 100 Ampere main circuit breaker.

8. The system of claim 4 wherein said vehicle comprises a number of first electrical apparatus; wherein said building comprises a number of branch circuits structured to provide power to a number of second electrical apparatus; wherein said corresponding one of said electrical conductors is a corresponding one of a number of first electrical power cables; wherein said another corresponding one of said electrical conductors is a second electrical power cable; wherein said at least one first electrical connector is electrically connected to a corresponding one of said first electrical apparatus of said vehicle by said corresponding one of said first electrical power cables; and wherein said second electrical connector is electrically connected through said load center to said branch circuits of said building by said second electrical power cable.

9. The system of claim 8 wherein said power line of said power pedestal provides plug-in power to said number of first electrical apparatus of said vehicle, and further provides plug-in power to said number of second electrical apparatus of said building, without a separate power line for said building; and wherein said meter of said power pedestal measures electric energy consumed by said number of first electrical apparatus of said vehicle, and further measures electric energy consumed by said branch circuits of said building, without a separate meter for said building.

10. The system of claim 8 wherein said power pedestal provides power through said load center to said branch circuits of said building, thereby powering said number of second electrical apparatus of said building.

11. The system of claim 10 wherein said number of second electrical apparatus of said building comprise at least one of a washing machine and a dryer.

12. The system of claim 4 wherein said housing of said power pedestal further comprises a first side and a second side disposed opposite the first side of said housing; wherein said meter is disposed on the first side of said housing; and wherein said number of first electrical connectors and said second electrical connector are disposed on the second side of said housing.

13. The system of claim 4 wherein said meter socket assembly comprises a meter socket and an electrical bus assembly; wherein said meter socket includes a first side and a second side disposed opposite the first side of said meter socket; wherein said meter is mounted on the first side of said meter socket; wherein said electrical bus assembly is disposed on the second side of said meter socket; and wherein said power line, said at least one first circuit breaker and said second circuit breaker are electrically connected to said electrical bus assembly.

14. The system of claim 4 wherein said at least one first circuit breaker is a number of branch circuit breakers; and wherein said second circuit breaker is a main circuit breaker.

15. The power pedestal of claim 3 wherein said number of second electrical apparatus comprises a washing machine and a dryer; and wherein said washing machine and said dryer are disposed within said building.

16. The system of claim 9 wherein said number of second electrical apparatus comprises a washing machine and a dryer; and wherein said washing machine and said dryer are disposed within said building.

* * * * *